US012561330B1

(12) United States Patent
Ng

(10) Patent No.: US 12,561,330 B1
(45) Date of Patent: Feb. 24, 2026

(54) DYNAMIC CACHING USING TEMPORARY CHECKPOINT DATABASE TABLES

(71) Applicant: Forge Global, Inc., San Francisco, CA (US)

(72) Inventor: Howe Ng, San Francisco, CA (US)

(73) Assignee: Forge Global, Inc., San Francisco, CA (US)

( * ) Notice: Subject to any disclaimer, the term of this patent is extended or adjusted under 35 U.S.C. 154(b) by 0 days.

(21) Appl. No.: 19/288,803

(22) Filed: Aug. 1, 2025

Related U.S. Application Data

(60) Provisional application No. 63/831,914, filed on Jun. 27, 2025.

(51) Int. Cl.
G06F 17/00 (2019.01)
G06F 16/22 (2019.01)
G06F 16/2455 (2019.01)

(52) U.S. Cl.
CPC .... G06F 16/24552 (2019.01); G06F 16/2282 (2019.01)

(58) Field of Classification Search
CPC ...................... G06F 16/24552; G06F 16/2282
See application file for complete search history.

(56) References Cited

U.S. PATENT DOCUMENTS

| | | | |
|---|---|---|---|
| 6,915,212 B2 * | 7/2005 | Kamps ..................... | G01V 1/28 |
| | | | 702/14 |
| 10,613,988 B2 * | 4/2020 | Gattegno ............ | G06F 12/0875 |
| 12,243,130 B2 | 3/2025 | Ponomarenko et al. | |
| 12,394,123 B2 | 8/2025 | Ponomarenko et al. | |
| 2016/0140132 A1 * | 5/2016 | Lin ..................... | G06F 16/2282 |
| | | | 707/637 |
| 2021/0125071 A1 | 4/2021 | Ren et al. | |
| 2024/0312081 A1 | 9/2024 | Ponomarenko et al. | |
| 2025/0028750 A1 | 1/2025 | Miculicich Werlen et al. | |
| 2025/0045634 A1 * | 2/2025 | Merrick .............. | G06F 16/2282 |

* cited by examiner

*Primary Examiner* — Greta L Robinson
(74) *Attorney, Agent, or Firm* — Perkins Coie LLP; Alberto Araiza; Aidan Faustina

(57) ABSTRACT

Systems, methods, and non-transitory, computer-readable storage media are disclosed herein for a processing platform that dynamically generates representative values and persistent data structures using cached temporary data structures. A mixed data input is retrieved for which each entry in the data has a corresponding timestamp. Depending on a predetermined time window within which the corresponding timestamp of a most recent entry of either primary input data or secondary input data to the mixed data input falls, particular caching operations resulting in temporary checkpoint data structures are performed to generate a representative value. The temporary checkpoint data structures are merged into a persistent data structure and stored, along with the representative value, in an output database.

20 Claims, 7 Drawing Sheets

DYNAMIC CACHING USING TEMPORARY CHECKPOINT DATABASE TABLES

CROSS REFERENCE TO RELATED APPLICATIONS

This application claims benefit of U.S. Provisional Application No. 63/831,914 filed Jun. 27, 2025, entitled "DYNAMIC CACHING USING TEMPORARY CHECKPOINT DATABASE TABLES", the entirety of which is incorporated herein by reference.

SUMMARY

Database systems have been used for many years and have become integral parts of the daily computing experience. Database systems have been designed to store and manage huge amounts of data as well as distribute this data over different locations around the world. Database systems may be useful in processing mixed data inputs to identify or determine various parameters related to mixed data inputs. In particular, database systems' ability to generate and delete temporary tables helps to generate final and intermediate results for different data calculations (e.g., using mixed data as input).

The systems, methods, and computer-readable media disclosed herein address these deficiencies by dynamically calculating representative values using different processes depending on the age of certain data retrieved from a mixed data input. A processing platform is described that tracks various inputs and predetermined time windows corresponding to different ranges of days in the past and performs different caching and generation operations to generate a representative value depending on which of the predetermined time windows a timestamp associated with an entry from the mixed data input falls within. Thus, unlike conventional platforms, the processing platform may account for different ages of data of various types and may reprocess data following a different series of steps when the age of the data increases or decreases such that the age changes from falling within a particular predetermined time window to a different window.

Additionally, the processing platform disclosed herein may cache results of intermediate calculations in the process of generating a representative value in temporary checkpoint data structures, which enables these results to be readily accessed at a low computational cost. Furthermore, the caching enables certain calculations that may have involved an error/deficiency to be repeated without expending unnecessary computational resources, as a temporary checkpoint data structure associated with a deficiency may be regenerated without having to regenerate temporary checkpoint data structures that were generated earlier in the chain of intermediate calculations.

Furthermore, the processing platform disclosed herein may generate additional variables corresponding to each entry in a mixed data input used for representative value generation, with the mixed data input including multiple sources of data. These variables, called categorical features, may associate a data type category and a time window category with each entry in the mixed data input. After the mixed data input is assigned the categorical features, the mixed data input may be used as input for one or more representative value machine learning models that are trained to generate one or more representative values. Thus, the machine learning models may use the categorical features to more accurately and efficiently generate representative values while accounting for multiple different sources of data.

The processing platform may perform the following operations when generating representative values. The processing platform may retrieve a mixed data input including at least primary input data, secondary input data, and indicative input data. The primary input data, secondary input data, and indicative input data may have a corresponding timestamp indicating a time of generation for the data. Primary input data may be associated with issuance of value indicators (e.g., company stocks), secondary input data may be associated with transfer of value indicators, and indicative input data may be associated with unacknowledged value indicator transfer requests (e.g., indications of interest (IOIs) or other bids/ask offers for stocks).

In response to the corresponding timestamp of a most recent entry of either primary input data or secondary input data to the mixed data input falling within a first predetermined time window, the processing platform may first cache a volume-weighted average based on the secondary input data in a first temporary checkpoint data structure (e.g., in a database table stored in volatile memory). The processing platform may then generate a first representative value for an entity based on either the volume-weighted average of the secondary input data or a latest value from the primary input data.

In response to the corresponding timestamp of a most recent entry of either primary input data or secondary input data to the mixed data input falling within a second predetermined time window (e.g., a time window of days further in the past than the first predetermined time window), the processing platform may first cache a validated subset of the indicative input data in a second temporary checkpoint data structure. The validated subset may include data from the indicative input data that meets certain criteria indicating the entries in the validated subset (e.g., records of various IOIs) are likely to be representative of a value of a company, such as being associated with recent activity indicating the entry is not outdated and/or being associated with a value that falls within an expected range, indicating the entry is not unrealistic. Next, the processing platform may cache a volume-weighted indicative average (e.g., a volume-weighted average of particular entries in the indicative input data) based on the validated subset in a third temporary checkpoint data structure and generate a second representative value based on the volume-weighted indicative average and either (i) the primary input data or (ii) a volume-weighted average of the secondary input data. Thus, the processing platform accounts for the increased age of the primary and/or secondary input data by supplementing the representative value calculation with indicative input data, which may include more recent indications of a value of an entity.

In some embodiments, whether a first entry in the indicative input data meets the criteria for being included in the validated subset involves determining a first value of the unacknowledged value indicator transfer request of the first entry and detecting that the unacknowledged value indicator transfer request of the first entry has a sending transfer type (e.g., the entry is a request to sell the value indicator). Next, the processing platform determines that the first value is higher than a highest request value associated with an entry of indicative input data of a receiving transfer type (e.g., the entry is a request to buy the value indicator), helping to verify that the entry is not a suspect transfer request that should have been acknowledged (e.g., because of mutual interest in buying/selling at a particular value) but remains unacknowledged. The processing platform may also determine that the first value is within a predetermined range from a lower value between (i) the volume-weighted average of the secondary input data and (ii) the highest request value, ensuring the first value is within a reasonable upper bound of the value for an entity. In these and other embodiments, the processing platform ensures the first entry has been recently updated before the first entry is included in the validated subset. For example, the processing platform may detect a change in value of the unacknowledged value indicator transfer request of the first entry, a change in value indicator type of the unacknowledged value indicator transfer request of the first entry (e.g., a change in the entity for which a transfer of a value indicator is being requested), and/or a change in transfer type of the unacknowledged value indicator transfer request of the first entry (e.g., a change from a request to buy to a request to sell or vice versa).

In response to the corresponding timestamp of a most recent entry of either primary input data or secondary input data to the mixed data input falling within a third predetermined time window (e.g., a time window of days further in the past than the second predetermined time window), the processing platform may first cache a validated subset of the indicative input data in a second temporary checkpoint data structure, as described above. The processing platform may then cache a volume-weighted indicative average based on the validated subset in a third temporary checkpoint data structure, also as described above. However, the processing platform will generate a third representative value based on the volume-weighted indicative average and not the primary input data or volume-weighted average of the secondary input data. Thus, the processing platform accounts for the even greater age of the primary and secondary input data by not factoring those data into the generation of the representative value at all, instead relying on the indicative input data that may include more recent indications of the value of an entity.

In some embodiments, the processing platform may create two sorted sets from the validated subset: one set with entries having a sending transfer type (e.g., offering to sell a stock) and another set with entries having a receiving transfer type (e.g., offering to buy a stock). The platform then caches a predetermined number of the lowest-valued indicative input data from the first set (e.g., lowest ask IOIs) in a fourth temporary checkpoint database table and the highest-valued indicative input data from the second set (e.g., highest bid IOIs) in a fifth temporary checkpoint database table. Next, the processing platform generates a volume-weighted indicative average by finding a median between the lowest-valued indicative input data entries and highest-valued indicative input data entries. This median may provide an accurate representation of an entity's value, as the same number of entries is taken from both groups to ensure the final value is not biased towards either sending transfer type data or receiving transfer type data.

Once a representative value is generated, the processing platform may merge at least one of the first temporary checkpoint data structure, the second temporary checkpoint data structure, or the third temporary checkpoint data structure into a persistent data structure (e.g., a database table stored in nonvolatile memory) and store the persistent data structure and at least one of the first representative value, the second representative value, or the third representative value in an output database.

In some embodiments, before the persistent database table is generated, the processing platform executes a validation routine for at least one of the temporary checkpoint data structures. A validation routine is a routine that may identify deficiencies in performing a calculation to determine whether the calculation should be repeated to ensure an acceptable level of quality. For example, the validation routine may be a duplicate check (e.g., a check for repeated input data), a null check (e.g., a check for input data with missing required fields), a categorical field check (e.g., a check that the categorical fields of an input conform to defined valid fields), a referential integrity check (e.g., a check for consistency between related datasets), and/or an expectation compatibility check (e.g., a comparison of a result of a calculation to a predetermined expected result). In response to the validation routine failing for one of the data structures, the processing platform may regenerate a first temporary checkpoint data structure associated with a deficiency causing the validation routine to fail, as well as data structures generated subsequently to the first temporary checkpoint data structure. When doing so, however, previous data structures for which the calculations have been successfully validated will not be recalculated, thereby conserving computational resources that would otherwise be spent on repeat calculations. After the regenerations dictated by the validation routine are performed, the processing platform may then merge the temporary checkpoint data structures into the persistent database table, thereby improving the overall reliability of data included in the persistent database table. In some embodiments, the temporary checkpoint data structures are then deleted to save memory.

In some embodiments, the processing platform retrieves, for each entry within the primary input data, the secondary input data, and the indicative input data, the corresponding timestamps. The processing platform then identifies, based on the corresponding timestamps and a current date, entries for which the corresponding timestamps have changed time windows (e.g., changing from falling within one predetermined time window on a previous day to falling within another predetermined time window on a current day). The processing platform then generates the mixed data input by combining the entries for which the corresponding timestamps have changed time windows. Thus, the mixed input data will only include data that needs to be processed differently than the last time the data was processed, enabling the processing platform to conserve computational resources that would otherwise be spent on simply calculating duplicate results.

In some embodiments, a first entity identifier (e.g., a unique identifier corresponding to an entity) is received, indicating a particular entity of interest for which to generate a representative value. In such embodiments, the processing platform may store the secondary input data in a labeled data structure (e.g., a labeled temporary database table) including entries labeled with the first entity identifier. The processing platform then caches a subset of data from the labeled data structure in a fourth temporary checkpoint database table. The subset is labeled with the first entity identifier, and the volume-weighted average is generated based on the fourth temporary checkpoint database table, which will only contain data associated with the entity of interest. Thus, the processing platform may avoid expending excess resources on calculations involving data associated with other entities that are not of interest.

DETAILED DESCRIPTION

Example Data Processing Environment

Figure 1:
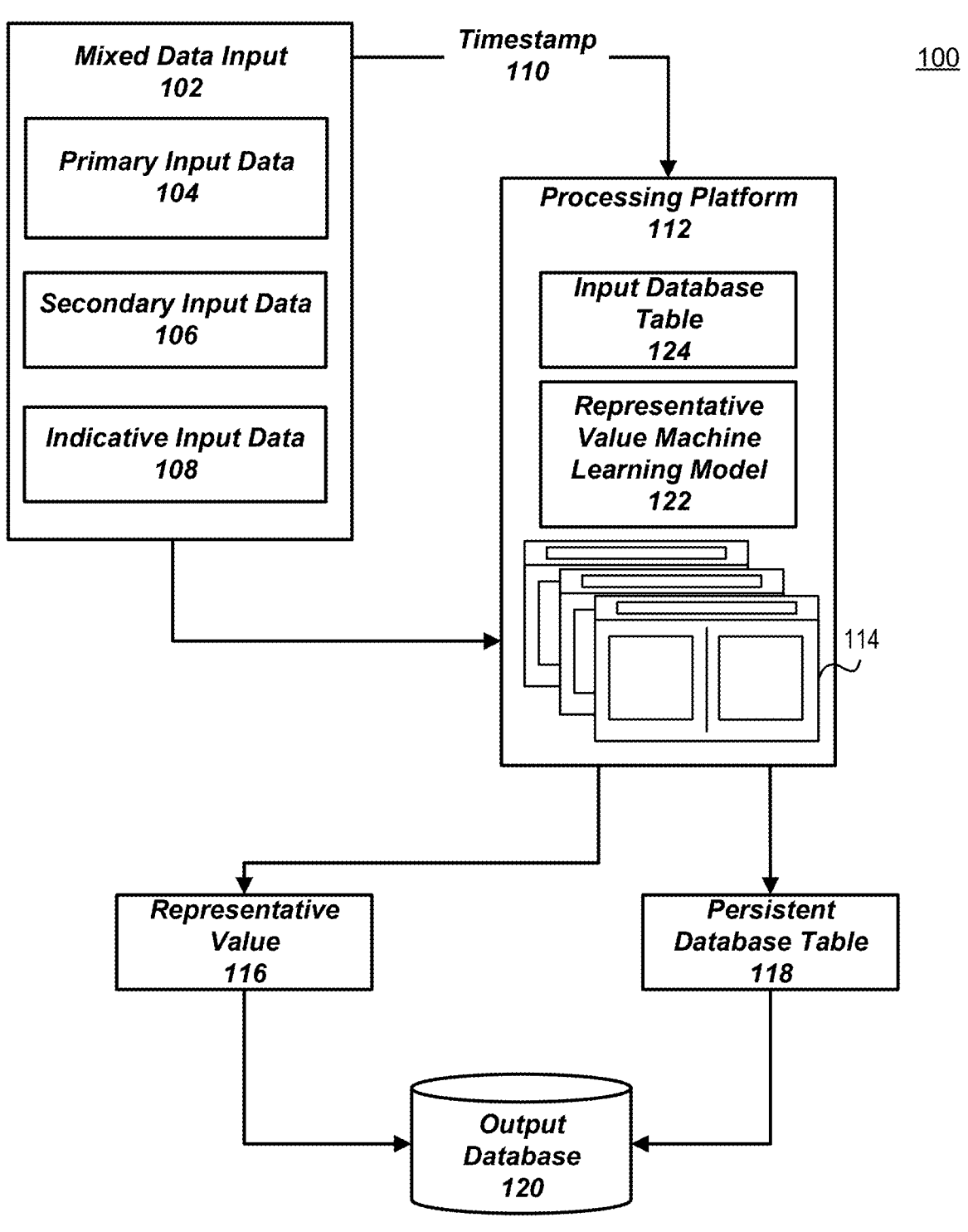
FIG. 1 is an example environment for processing various types of data to generate representative values and persistent data structures as output.

FIG. 1 is an example of environment 100 for processing various types of data to generate representative values and persistent data structures as output. Environment 100 includes mixed data input 102 (which includes primary input data 104, secondary input data 106, and indicative input data 108), timestamp 110, processing platform 112 including temporary checkpoint database tables 114, representative value 116, persistent database table 118, and output database 120. Processing platform 112 may include software, hardware, or a combination of the two. For example, processing platform 112 may be hosted on a physical server or a virtual server that is running on a physical computer system. In some embodiments, processing platform 112 may be configured on a user device (e.g., a laptop computer, a smartphone, a desktop computer, an electronic tablet, or another suitable user device). In some embodiments, processing platform 112 is distributed across a plurality of computing devices and may include a memory optimization engine that scales an amount of memory allocated across the computing devices to processing platform 112 according to the processing demands of processing platform 112. For example, the memory optimization engine may be a Snowflake® data warehouse hosted by Amazon Web Services® or another similar cloud data warehouse.

In some embodiments, processing platform 112 receives mixed data input 102. Mixed data input 102 may be a collection of data of a plurality of types. For example, as depicted in FIG. 1, mixed data input 102 may include primary input data 104, secondary input data 106, and indicative input data 108, each of which may include data of a different type. In some embodiments, primary input data 104 is data associated with issuance of value indicators, which are individual transactable units of ownership of an entity (e.g., shares of a company) that, when combined, indicate an overall value for the entity. For example, primary input data 104 may include stock issued by a company during a primary funding round. In these and other embodiments, secondary input data 106 is data associated with transfer (rather than issuance) of value indicators. For example, secondary input data 106 may include secondary market transactions of the stock of an entity, including pending and/or closed transactions. In these and other embodiments, indicative input data 108 is data associated with unacknowledged value indicator transfer requests, which are publicly made requests by an entity to transfer (e.g., buy, sell) a value indicator to/from another entity but which have not been interacted with by any other entities interested in making the transfer. For example, indicative input data 108 may include open indications of interest (IOIs), which are nonbinding statements of an entity's interest in transferring a value indicator (e.g., bids, asks) that have not yet been interacted with (e.g., accepted, negotiated, archived, or otherwise acknowledged) by a potential transferor/transferee. In some embodiments, primary input data 104 is retrieved by extracting, using a text recognition model, data entries from an image file associated with an issuance of a value indicator. For example, issuances of value indicators may be recorded in certificates of incorporation (COIs), which may be stored in publicly accessible databases as image files (e.g., PDF files), and thus retrieving these records from the image files using the text recognition model may be an effective way of retrieving primary input data 104. The text recognition model may be an optical character recognition (OCR) model, a machine learning model configured to recognize text, and/or another text recognition model.

In some embodiments, each entry (e.g., each individual datum) in mixed data input 102 is associated with a corresponding timestamp indicating a time of generation for the entry (e.g., a date/time of creation, a number of days since creation). In such embodiments, timestamp 110 is extracted from mixed data input 102 and received by processing platform 112. Timestamp 110 may be the corresponding timestamp of a most recent entry (e.g., the most recently generated datum) of either primary input data 104 or secondary input data 106 to mixed data input 102. Thus, timestamp 110 may change as the most recent entry ages and/or new data is received, resulting in a newer most recent entry.

In some embodiments, mixed data input 102 is aggregated into input database table 124 which includes a plurality of entries from mixed data input 102. For example, each of primary input data 104, secondary input data 106, and indicative input data 108 may be stored in separate database tables and one or more entries from each may then be aggregated into input database table 124. Within input database table 124, each entry from the plurality of entries may be associated with a plurality of categorical features. For example, the plurality of categorical features may include a data type feature, where each entry is assigned a corresponding category of the data type feature based on whether the corresponding entry is from primary input data 104, secondary input data 106, or indicative input data 108. Continuing with this example, the categories of the data type feature may be a primary input data category, a secondary input data category, and an indicative data category. As another example, the plurality of categorical features may include a time window feature, where each entry is assigned a corresponding time window based on a particular difference between a current date and the corresponding timestamp for each entry. Continuing with the same example, a first difference for a first entry within input database table 124 may be calculated that represents a number of days between the current date and a corresponding timestamp for the first entry. Then depending on whether the number of days falls within a first predetermined time window, a second predetermined time window, or a third predetermined time window, the first entry may be assigned to a time window of the time window feature corresponding to the first predetermined time window, the second predetermined time window, or the third predetermined time window, respectively. In some embodiments, the first predetermined time window is the most recent time window (e.g., the time window representing a range of days closest to the current day), while the second time window is the next most recent time window and the third predetermined time window is the least recent time window. In some embodiments, mixed data input 102 is input into an anomaly detection model to receive a set of outlier data. For example, the anomaly detection model may be a machine learning model trained to detect outliers within data, such as a support vector machine (SVM) or a k-nearest neighbors (KNN) algorithm, or another model for detecting anomalous data. In such embodiments, before aggregating the mixed data input into the database table, the set of outlier data is removed from mixed data input 102. Thus, computational efficiency is improved by reducing the size of mixed data input 102 (and by extension input database table 124) so that future operations involving mixed data input 102 can be executed using reduced computational resources without reductions in accuracy, as the removed data are outliers that are unlikely to provide meaningful data insights.

In some embodiments, processing platform 112 includes one or more temporary checkpoint database tables 114. Temporary checkpoint database tables 114 are database tables that are generated by processing platform 112 to store results of intermediate calculations/operations performed on mixed data input 102. For example, mixed data input 102 may include data associated with a plurality of different entities, and processing platform 112 may perform calculations such that data associated with each entity is processed separately, generating one or more results for each entity. Continuing with the same example, temporary checkpoint database tables 114 may include a row or column of entity identifiers, which are unique identifiers corresponding to one of the entities in the plurality of different entities. Again, continuing with the same example, temporary checkpoint database tables 114 may include rows/columns of results aligned with the row or column of entity identifiers, thereby labeling each result with an entity identifier indicating the entity for which the result is relevant.

Temporary checkpoint database tables 114 are used to cache results of intermediate calculations so that a record is temporarily maintained of each intermediate calculation performed by processing platform 112 that may be validated or otherwise inspected to determine if any errors/deficiencies occurred in performing the intermediate calculation. When a deficiency is detected by validating a particular temporary checkpoint database table 114, the intermediate calculation may be repeated without having to repeat previous intermediate calculations that were the basis of the intermediate calculation, as results of those previous intermediate calculations are cached in other temporary checkpoint database tables 114. Thus, temporary checkpoint database tables 114 enable processing platform 112 to reduce the number of calculations performed to resolve any errors/deficiencies, conserving computational resources of processing platform 112 overall. Temporary checkpoint database tables 114 are cached rather than stored in a persistent format so that temporary checkpoint database tables 114 may be retrieved more quickly and will not be retained permanently, thereby increasing the speed and reducing the memory requirements of processing platform 112. For example, temporary checkpoint database tables 114 may be deleted after the data contained therein has been replicated elsewhere (e.g., in a different temporary checkpoint database table or a persistent data structure), enabling conservation of computational resources by reducing the data storage demands of processing platform 112 without losing access to the ultimate results of validated intermediate calculations. Although temporary checkpoint database tables 114 are described herein as database tables, the present invention is not so limited; other temporary data structures may be used to perform the functions of temporary checkpoint database tables 114.

Often, the value of data associated with an entity (e.g., an individual, a company, or another organization) for representing a present condition (e.g., a valuation) of the entity varies with the age of the data or the time that has passed since the data was generated. For example, because the conditions affecting an entity are likely to vary more greatly between a current date and a previous date the further in the past the previous date lies, data generated on the previous date may be less representative of conditions at the current date than more recent data and/or may need to be processed differently than more recent data in order to generate meaningful representations of the entity.

Many existing processing platforms that process data associated with entities from various sources and of various ages do not adequately account for the challenges inherent in processing data of various ages. Often, all data retrieved by these platforms will be processed in the same manner regardless of the data's age and/or data will not be reprocessed in a different manner as the age of the data increases, making a different processing method more appropriate. In particular, processing platforms generating a representative value (e.g., an indicative price or other valuation metric) for one or more entities often fail to account for the differences in reliability between different data sources, especially with regard to how those reliabilities may change over time as data ages. Furthermore, these platforms often lack a means for efficiently accessing the results of intermediate calculations performed during generation of a representative value and/or for efficiently validating the reliability of these results before generating a final representative value.

To improve upon these deficiencies in existing processing platforms, in some embodiments, processing platform 112 tracks one or more predetermined time windows, which are ranges of times in the past with respect to a current date on which processing platform 112 is being operated, enabling the operations of processing platform 112 to dynamically adjust to the age of data received by processing platform 112. The predetermined time windows may be predetermined by a user of processing platform 112, administrator/developer of processing platform 112, or another entity. For example, processing platform 112 may track a first predetermined time window, a second predetermined time window, and a third predetermined time window, each including days that are increasingly further in the past from the current date. Continuing with the same example, the first predetermined time window may be a time window of 0-90 days from the current date, the second predetermined time window may be a time window of 90-180 days from the current date, and the third predetermined time window may be a time window of 180 days from the current date and onwards.

Processing platform 112 may process mixed data input 102 differently depending on the particular predetermined time window that timestamp 110 falls within. Thus, the processing performed by processing platform 112 is dynamically adjusted based on timestamp 110, thereby accounting for the decrease in the representativeness/reliability that may occur for data in mixed data input 102 over time as the data ages. Examples of different processing corresponding to different time windows are described below in relation to FIGS. 2-4.

Figure 2:
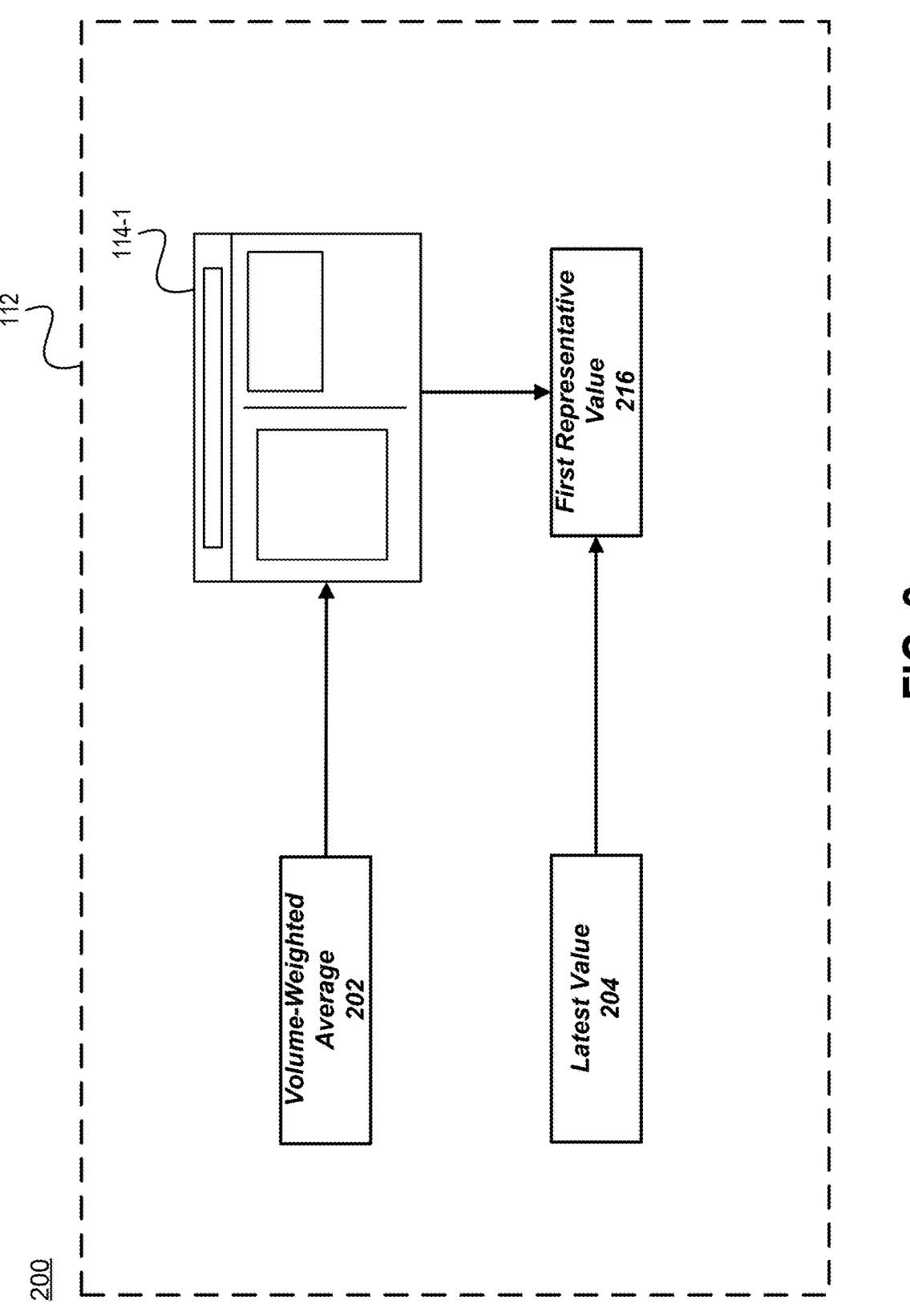
FIG. 2 is a first example generation process performed by a processing platform when a timestamp falls within a first predetermined time window.

FIG. 2 is a first example generation process 200 performed by processing platform 112 when timestamp 110 falls within a first predetermined time window. In some embodiments, the first predetermined time window is the most recent time window with respect to the current date that is tracked by processing platform 112. Process 200 begins with caching volume-weighted average 202 in first temporary checkpoint database table 114-1. Volume-weighted average 202 may be calculated by performing a volume-weighted average on the entries in secondary input data 106 having a timestamp that falls within the first predetermined time window. In some embodiments where mixed data input 102 includes data associated with a plurality of different entities, volume-weighted average 202 includes a plurality of volume-weighted averages separately calculated using data associated with one of the entities from the plurality of entities. In such embodiments, volume-weighted average 202 may be cached in first temporary checkpoint database table 114-1 by storing each volume-weighted average in a row or column labeled with an entity identifier corresponding to the associated entity.

Process 200 then proceeds to the generation of first representative value 216. First representative value 216 is a numerical value that, based on the processing of mixed data input 102 by processing platform 112, is representative of a value of an entity (e.g., representative of a fair value/an estimated current value for a single value indicator, or an aggregate of all issued value indicators, for a private company) at the current date. As depicted in FIG. 2, first representative value 216 is generated based on either volume-weighted average 202 (e.g., as read from first temporary checkpoint database table 114-1 for a particular entity) and/or latest value 204, which is an entry from primary input data 104 associated with a most recent corresponding timestamp. In some embodiments, first representative value 216 is the most recent (e.g., associated with the most recent corresponding timestamp) of volume-weighted average 202 or latest value 204, thereby enabling first representative value 216 to reflect up-to-date data available about an entity of interest. In other embodiments, first representative value 216 is a combination (e.g., an arithmetic mean) of volume-weighted average 202 and latest value 204, enabling different indicators of an entity's value from the different data sources to be accounted for.

Figure 3:
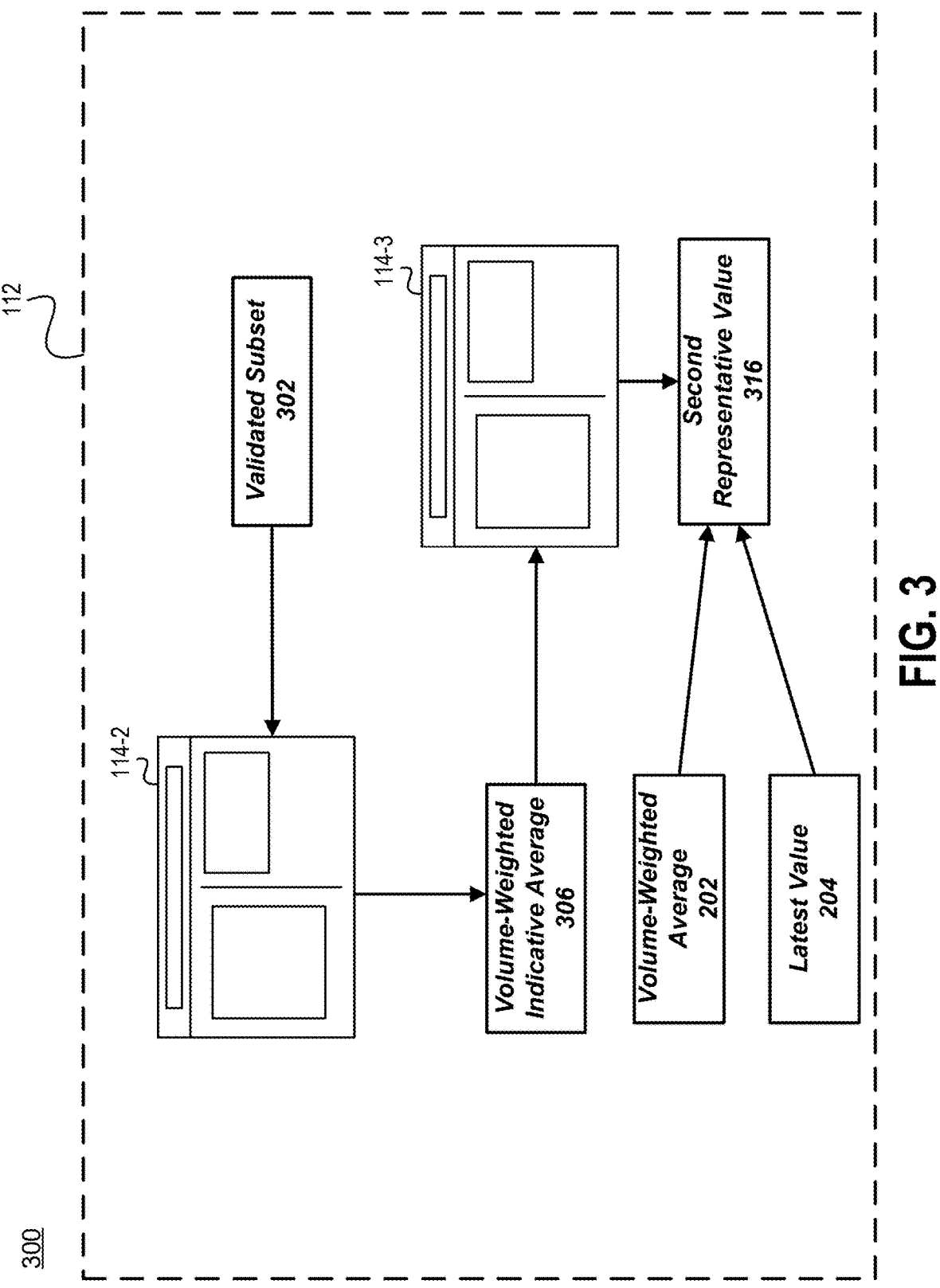
FIG. 3 is a second example generation process performed by a processing platform when a timestamp falls within a second predetermined time window.

FIG. 3 is a second example generation process 300 performed by processing platform 112 when timestamp 110 falls within a second predetermined time window. In some embodiments, the second predetermined time window is the second-most recent time window with respect to the current date that is tracked by processing platform 112 (e.g., the time window between the first and third predetermined time windows). Process 300 begins with caching validated subset 302 in second temporary checkpoint database table 114-2. Second temporary checkpoint database table 114-2 is generally similar to first temporary checkpoint database table 114-1, except that validated subset 302, instead of volume-weighted average 202, is cached therein. Validated subset 302 is a subset of data from indicative input data 108 that satisfies one or more validation criteria indicating the data will contribute to the accurate generation of a representative value. For example, validated subset 302 may include data that (i) is associated with a recent material update, (ii) has a value greater than a predetermined threshold value, and (iii) satisfies a set of plausibility criteria. Recent material updates are updates to value indicator transfer requests associated with indicative input data 108 that are made by entities that created those requests. For example, processing platform 112 may determine that a first entry in the indicative input data is associated with a recent material update by detecting a change in value (e.g., a change from a transfer of value indicators worth a first amount of a currency to a transfer of value indicators worth a second amount of the currency, a notional value) of the unacknowledged value indicator transfer request of the first entry. As a second example, processing platform 112 may detect a change in value indicator type (e.g., a change in requesting value indicators issued by a first entity to value indicators issued by a second entity) of the unacknowledged value indicator transfer request of the first entry. As a third example, processing platform 112 may detect a change in transfer type (e.g., a change in a request of a sending transfer type to a request of a receiving transfer type, as described below, or vice versa). The predetermined threshold value may be a value determined by a user of processing platform 112, administrator/developer of processing platform 112, or another entity, below which value indicator transfer requests are not considered indicative of the value of an entity.

The set of plausibility criteria may be one or more additional criteria indicating that a value indicator transfer request is a plausible indicator of the value of an entity. For example, processing platform 112 may determine that the set of plausibility criteria is satisfied for a first entry in the indicative input data by determining a first value of the unacknowledged value indicator transfer request of the first entry and detecting that the request has a sending transfer type. An unacknowledged value indicator transfer request having a sending transfer type is a request to send a value indicator to another entity (e.g., a request to sell the value indicator). Conversely, an unacknowledged value indicator transfer request having a receiving transfer type is a request to receive a value indicator from another entity (e.g., a request to buy the value indicator). When the values of unacknowledged value indicator transfer requests having different types "cross," meaning the value of a sending transfer type request is lower than that of a receiving transfer type request, or the value of a receiving transfer type request is higher than that of a sending transfer type request, this may be cause to question the plausibility of the requests. This suspicion arises because crossing requests should result in a completed transfer, as completing a transfer at one of the two values in the crossing requests would be mutually acceptable to the requesting entities. Thus, when no acknowledgment of a crossing request has occurred, it is therefore likely the requests are invalid and should not be considered when generating a representative value for an entity.

Continuing with the same example, processing platform 112 accordingly further determines the set of plausibility criteria is satisfied by determining the first value is higher than highest request value associated with an entry of indicative input data 108 of a receiving transfer type (e.g., the largest value of an entry in indicative input data 108, where the entry has an unacknowledged value indicator transfer request having a receiving transfer type). Thus, processing platform 112 confirms that the first entry does not cross with another entry in indicative input data 108 and is therefore a plausible transfer request that may accurately reflect the value of an entity. Additionally or alternatively, processing platform 112 may determine the set of plausibility criteria is satisfied by determining the first value is within a predetermined range (e.g., within a certain percentage of a value) from a lower value between (i) volume-weighted average 202 and (ii) the highest request value described above. Because the lower of these two values serves as a plausible upper estimate for the value of an entity, validating that the first value does not fall exceedingly far from this upper estimate bolsters the plausibility of the first entry.

Process 300 then continues with caching volume-weighted indicative average 306 in third temporary checkpoint database table 114-3. Third temporary checkpoint database table 114-3 is generally similar to first temporary checkpoint database table 114-1 and second temporary checkpoint database table 114-2, except that volume-weighted indicative average 306 instead of validated subset 302 or volume-weighted average 202 is cached therein. Volume-weighted indicative average 306 is a volume-weighted average based on validated subset 302 and may be calculated by extracting data from validated subset 302 from second temporary checkpoint database table 114-2. In some embodiments, volume-weighted indicative average 306 is only based on particular entries in validated subset 302 that are considered representative of the entire subset, as this conserves computational resources without sacrificing the ability of volume-weighted indicative average 306 to represent the entirety of validated subset 302. For example, processing platform 112 may sort a first set of entries from validated subset 302 into a sorted first set, the first set of entries having a sending transfer type. Continuing with the same example, processing platform 112 may then cache a predetermined number of lowest-valued indicative input data from the sorted first set of indicative input data having a sending transfer type (e.g., entries of the lowest ask IOIs in indicative input data 108) in a fourth temporary checkpoint database table. Again, continuing with the same example, processing platform 112 may sort a second set of entries from validated subset 302 into a sorted second set, the second set of entries having a receiving transfer type, and then cache a predetermined number of highest-valued indicative input data from the sorted second set of indicative input data having a receiving transfer type (e.g., entries of the highest bid IOIs in indicative input data 108) in a fifth temporary checkpoint database table. Finally, in this example, processing platform 112 generates volume-weighted indicative average 306 by calculating a median based on the data in the fourth temporary checkpoint database table and the fifth temporary checkpoint database table, thereby selecting a midpoint between the two sets of entries that may serve as an accurate representation of a value of an entity. The predetermined number of lowest-valued indicative input data entries and highest-valued indicative input data entries may match (e.g., may be the same), thereby helping not to skew the calculation towards accounting for either of the sending transfer type data or receiving transfer type data more heavily.

Process 300 then generates second representative value 316, which is a numerical value having the same representative nature as first representative value 216 but which is based on different inputs. For example, as depicted in FIG. 3, second representative value 316 is based on volume-weighted indicative average 306 (e.g., as read from third temporary checkpoint database table 114-3 for a particular entity) and either volume-weighted average 202 or latest value 204. Combining these inputs to generate second representative value 316 when timestamp 110 falls within the second predetermined time window allows processing platform 112 to account for the somewhat aged nature of volume-weighted average 202 and latest value 204 by supplementing those data with volume-weighted indicative average 306, which may include more recent indications of a value of an entity of interest.

Figure 4:
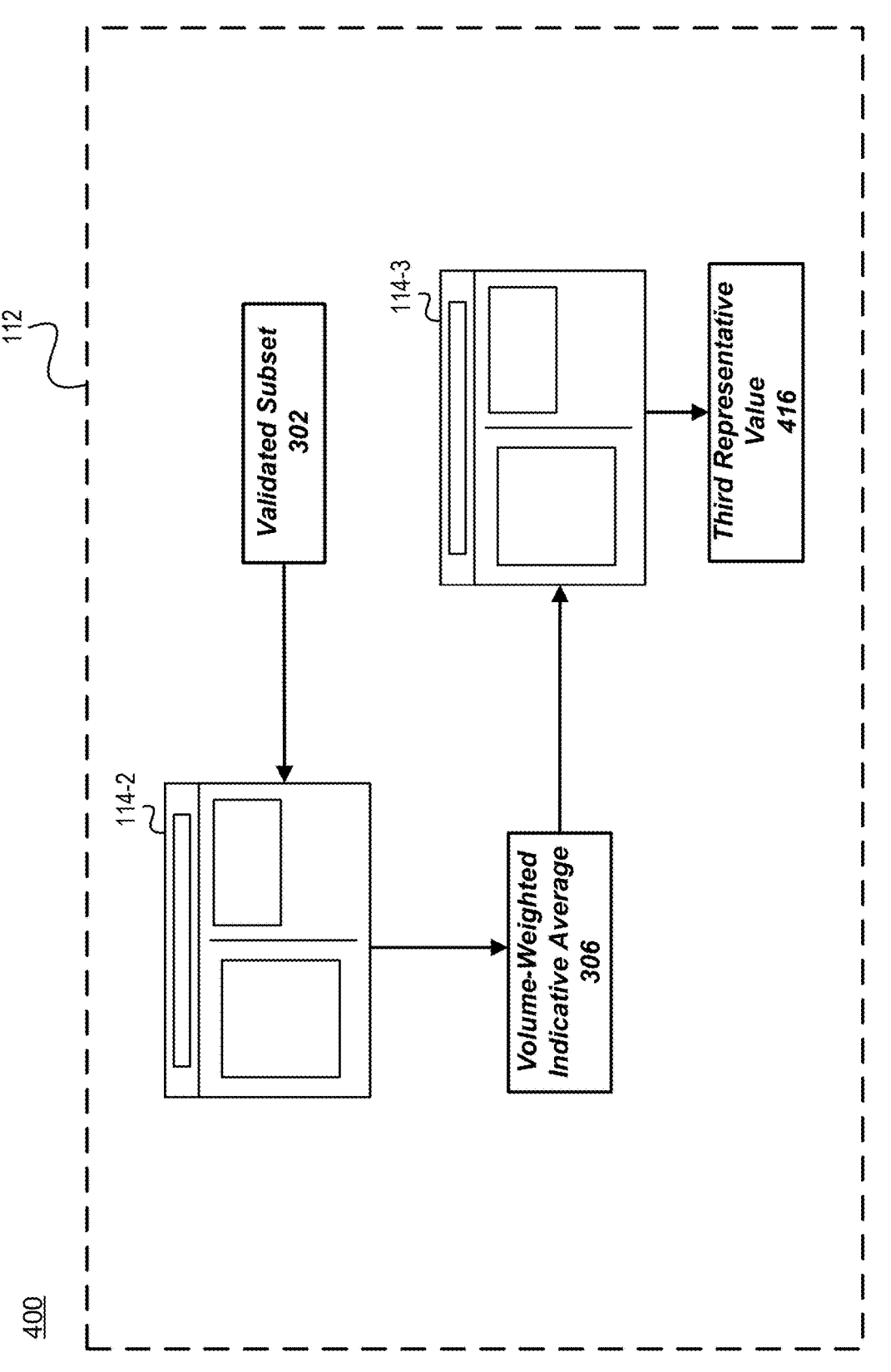
FIG. 4 is a third example generation process performed by a processing platform when a timestamp falls within a third predetermined time window.

FIG. 4 is a third example generation process 400 performed by processing platform 112 when timestamp 110 falls within a third predetermined time window. In some embodiments, the third predetermined time window is the least recent time window with respect to the current date that is tracked by processing platform 112 (e.g., the oldest time window). Process 400 begins with caching validated subset 302 in second temporary checkpoint database table 114-2 and caching volume-weighted indicative average 306 in third temporary checkpoint database table 114-3, both in the same or a generally similar manner to the manner described in relation to FIG. 3 above. However, process 400 then proceeds to generate third representative value 416, which is only based on volume-weighted indicative average 306 (e.g., as read from third temporary checkpoint database table 114-3 for a particular entity). Third representative value 416 is a numerical value having the same representative nature as first representative value 216 and second representative value 316 but which accounts for the even more aged nature of volume-weighted average 202 and latest value 204 by excluding those data entirely and representing a value of an entity of interest solely based on indicative input data 108.

Because different processes 200, 300, 400 are performed depending on timestamp 110, as each day goes by and the current date moves further away from timestamp 110, the processing to be applied to mixed data input 102 by processing platform 112 may change (e.g., by timestamp 110 crossing a threshold between the predetermined time windows), even though mixed data input 102 itself has not changed in terms of content. Additionally, in some embodiments, the most recent entry of either primary input data 104 or secondary input data 106 to mixed data input 102 may be evaluated independently for different entities and be assigned as the current timestamp of data associated with that entity. In such embodiments, the current timestamp of different entities may differ, meaning the processing to apply to a first set of entries associated with a first entity may, on a particular current day, change from a previous day, while the processing to apply to a second set of entries associated with a second entity does not. Thus, to automatically apply the appropriate processing to each entry, processing platform 112 may retrieve, for each entry within the primary input data, the secondary input data, and the indicative input data, the corresponding timestamps. Processing platform 112 may then identify, based on the corresponding timestamps and the current date, entries for which the corresponding timestamps have changed time windows. For example, changing time windows may include having a corresponding timestamp changing from falling within the first predetermined time window on a previous day to falling within the second predetermined time window on a current day and/or having a corresponding timestamp changing from falling within the second predetermined time window on the previous day to falling within the third predetermined time window on the current day. Processing platform 112 may then generate mixed data input 102 by combining the entries for which the corresponding timestamps have changed time windows. Thus, processing platform 112 processes only data for which new calculations are to be applied, enabling processing platform 112 to conserve computational resources that would otherwise be spent on simply calculating duplicate results.

Referring again to FIG. 1, after processing platform 112 processes mixed data input 102 in a manner determined by timestamp 110 (e.g., one of the processes described in relation to FIGS. 2-4 above), processing platform 112 produces representative value 116 and persistent database table 118 as output. Representative value 116 is a numerical value that, based on the processing of mixed data input 102 by processing platform 112, is representative of a value of an entity at the current date (e.g., first representative value 216, second representative value 316, or third representative value 416). In some embodiments, representative value machine learning model 122 is included in processing platform 112. Processing platform 112 may train representative value machine learning model 122 to generate one or more representative values (e.g., representative value 116) for an entity using weights and patterns associated with mixed data input 102 (e.g., associated with contents of input database table 124 described above). For example, representative value machine learning model 122 may use weights and patterns to determine the one or more representative values by determining a first weight for primary input data 104, a second weight for secondary input data 106, and a third weight for indicative input data 108. Continuing with the same example, representative value machine learning model 122 may determine a first pattern of values (e.g., recurring or similar indications of value and/or predictable changes in value for an entity) based on primary input data 104, a second pattern of values based on secondary input data 106, and a third pattern of values based on indicative input data 108 and associate these patterns of values with the first weight, the second weight, and the third weight, respectively. Again continuing with the same example, representative value machine learning model 122 may combine the first pattern of values, the second pattern of values, and the third pattern of values to generate representative value 116. This combination may be based on the respective weights such that each pattern of values from the first pattern of values, the second pattern of values, and the third pattern of values contributes to the ultimate value of representative value 116 proportionally to the weight associated with the pattern.

In some embodiments where a first time window of the time window feature is the most recent time window, a difference (e.g., a number of days) between the current date and a corresponding timestamp of a most recent entry to input database table 124 of either primary input data 104 or secondary input data 106 is calculated. Then, upon determining that the first difference falls within the first time window and before inputting mixed data input 102 into the representative value machine learning model, indicative input data 108 is removed from mixed data input 102. For example, indicative input data 108 may be removed because indicative input data 108 is not an input for the representative value machine learning model when the first difference falls within the first time window (e.g., because more reliable data is available, such as recent primary input data 104 or secondary input data 106).

In some embodiments where representative value 116 is generated by representative value machine learning model 122, the modeling ability of representative value machine learning model 122 is improved by generating first representative value 216, second representative value 316, and/or third representative value 416 as described herein and then comparing representative value to at least one of first representative value 216, second representative value 316, or third representative value 416. Representative value machine learning model 122 is then retrained based on a result of the comparing (e.g., a difference, an error, and/or a standard deviation), thereby enabling representative values generated by representative value machine learning model 122 to more closely align with representative values generated in one or more of the deterministic manners (e.g., the manners not involving a machine learning model) described herein.

In these and other embodiments, representative value machine learning model 122 is trained by calculating a first accuracy for a first representative value. The first representative value is generated by representative value machine learning model 122 based on all the features from the plurality of categorical features, as described above. An accuracy is a numerical representation of the closeness of a representative value to one or more target values/expected values (e.g., a difference, an error, and/or a standard deviation). A second accuracy is also calculated for a second representative value generated by representative value machine learning model 122, but the second representative value is generated based on only a subset of the features from the plurality of categorical features. A difference between the first accuracy and the second accuracy is then determined and compared to a predetermined accuracy threshold. This comparison enables processing platform 112 to determine whether a significant loss in accuracy is caused by generating representative values based only on a subset of the plurality of categorical features rather than the entire plurality. In response to determining the difference is less than or equal to the predetermined accuracy threshold, thereby signaling the loss in accuracy is insignificant, processing platform 112 directs representative value machine learning model 122 to generate future representative values based on the subset of the features from the plurality of categorical features, thereby improving computational efficiency as the computational resources required to operate representative value machine learning model 122 are reduced without a significant loss in accuracy.

Persistent database table 118 is a database table of a generally similar structure to the temporary checkpoint database tables 114, except that persistent database table 118 is stored in persistent memory rather than being cached. In some embodiments, persistent database table 118 is generated by merging at least one of first temporary checkpoint database table 114-1, second temporary checkpoint database table 114-2, and third temporary checkpoint database table 114-3. For example, merging the temporary checkpoint database tables 114 may include selecting a subset of data from each temporary checkpoint database tables 114 labeled with an entity identifier corresponding to an entity of interest and combining those subsets into a single database table. As another example, merging may include performing additional calculations on the data in the temporary checkpoint database tables 114 and storing the results in persistent database table 118. Although persistent database table 118 is described herein as a database table, the present technology is not so limited; other persistent data structures may be used to perform the functions of persistent database table 118.

In some embodiments, before persistent database table 118 is generated, processing platform 112 executes a validation routine for at least one of first temporary checkpoint database table 114-1, second temporary checkpoint database table 114-2, or third temporary checkpoint database table 114-3. A validation routine is a routine that may identify errors in a calculation, anomalies in the input to a calculation, and/or other deficiencies in performing a calculation to determine whether the calculation should be repeated to ensure an acceptable level of quality. For example, the validation routine may be a duplicate check (e.g., a check for repeated input data), a null check (e.g., a check for input data with missing required fields), a categorical field check (e.g., a check that the categorical fields of an input conform to defined valid fields), a referential integrity check (e.g., a check for consistency between related datasets), and/or an expectation compatibility check (e.g., a comparison of a result of a calculation to a predetermined expected result). In some embodiments, the validation routine is executed by sending the first temporary checkpoint database table 114-1, second temporary checkpoint database table 114-2, and/or third temporary checkpoint database table 114-3 to a human for manual review. The manual review may include the human performing one or more of the checks described above manually. In such embodiments, the human reviewer then inputs to processing platform 112 an indication of either a successful validation or a failed validation, the latter of which may include an indication of a particular deficiency needing to be fixed. In response to the validation routine failing for one of first temporary checkpoint database table 114-1, second temporary checkpoint database table 114-2, or third temporary checkpoint database table 114-3, processing platform 112 can regenerate a temporary checkpoint database table associated with a deficiency causing the validation routine to fail, as well as subsequent temporary checkpoint database tables, without recalculating previous database tables for which the calculations have been successfully validated.

For example, in embodiments where third temporary checkpoint database table 114-3 depends on second temporary checkpoint database table 114-2 and second temporary checkpoint database table 114-2, in turn, depends on first temporary checkpoint database table 114-1, in response to determining that the validation routine has failed for first temporary checkpoint database table 114-1, processing platform 112 may regenerate first temporary checkpoint database table 114-1, second temporary checkpoint database table 114-2, and third temporary checkpoint database table 114-3, as the deficiency would have impacted all three database tables. However, in response to determining that the validation routine has failed for second temporary checkpoint database table 114-2, processing platform 112 will only regenerate second temporary checkpoint database table 114-2 and third temporary checkpoint database table 114-3. Likewise, in response to determining that the validation routine has failed for third temporary checkpoint database table 114-3, processing platform 112 will only regenerate third temporary checkpoint database table 114-3. After the regenerations dictated by the validation routine are performed, first temporary checkpoint database table 114-1, second temporary checkpoint database table 114-2, and/or third temporary checkpoint database table 114-3 may be merged into persistent database table 118, thereby improving the reliability of data in persistent database table 118. In some embodiments, first temporary checkpoint database table 114-1, second temporary checkpoint database table 114-2, and third temporary checkpoint database table 114-3 are then deleted to save memory, as data from those temporary checkpoint database tables 114 has already been stored in persistent database table 118 and validated such that the checkpoints provided by temporary checkpoint database tables 114 need no longer be retained.

In some embodiments, representative value 116 and persistent database table 118 are stored (e.g., by processing platform 112) in output database 120. Output database 120 may include software, hardware, or a combination of the two. For example, output database 120 may be a physical server or a virtual server that is running on a physical computer system. In some embodiments, processing platform 112 and output database 120 may reside on the same hardware and/or the same virtual server/computing device. Output database 120 may be accessible via one or more application programming interfaces (APIs), enabling other software platforms besides processing platform 112 to access data stored in output database 120.

In such embodiments, a first entity identifier corresponding to an entity associated with a subset of mixed data input 102 may be received, triggering a particular manner of storing data in output database 120. For example, processing platform 112 may select a subset of data from persistent database table 118 that is labeled with the first entity identifier and select representative value 116 from among first representative value 216, second representative value 316, and third representative value 416 based on the selected value being associated with the first entity identifier (e.g., by being based on data associated with the entity corresponding to the first entity identifier). Continuing with the same example, the subset of data and representative value 116 are then stored in output database 120 by overwriting a previous subset of data associated with the first entity identifier and a previous representative value associated with the first entity identifier. In this manner, information in output database 120 associated with the entity is updated to a latest available version without writing additional data generated by processing platform 112 to the output database that is not associated with the entity, thereby conserving computational resources that would otherwise be spent on copying/storing data regarding entities that are not of interest.

Figure 5:
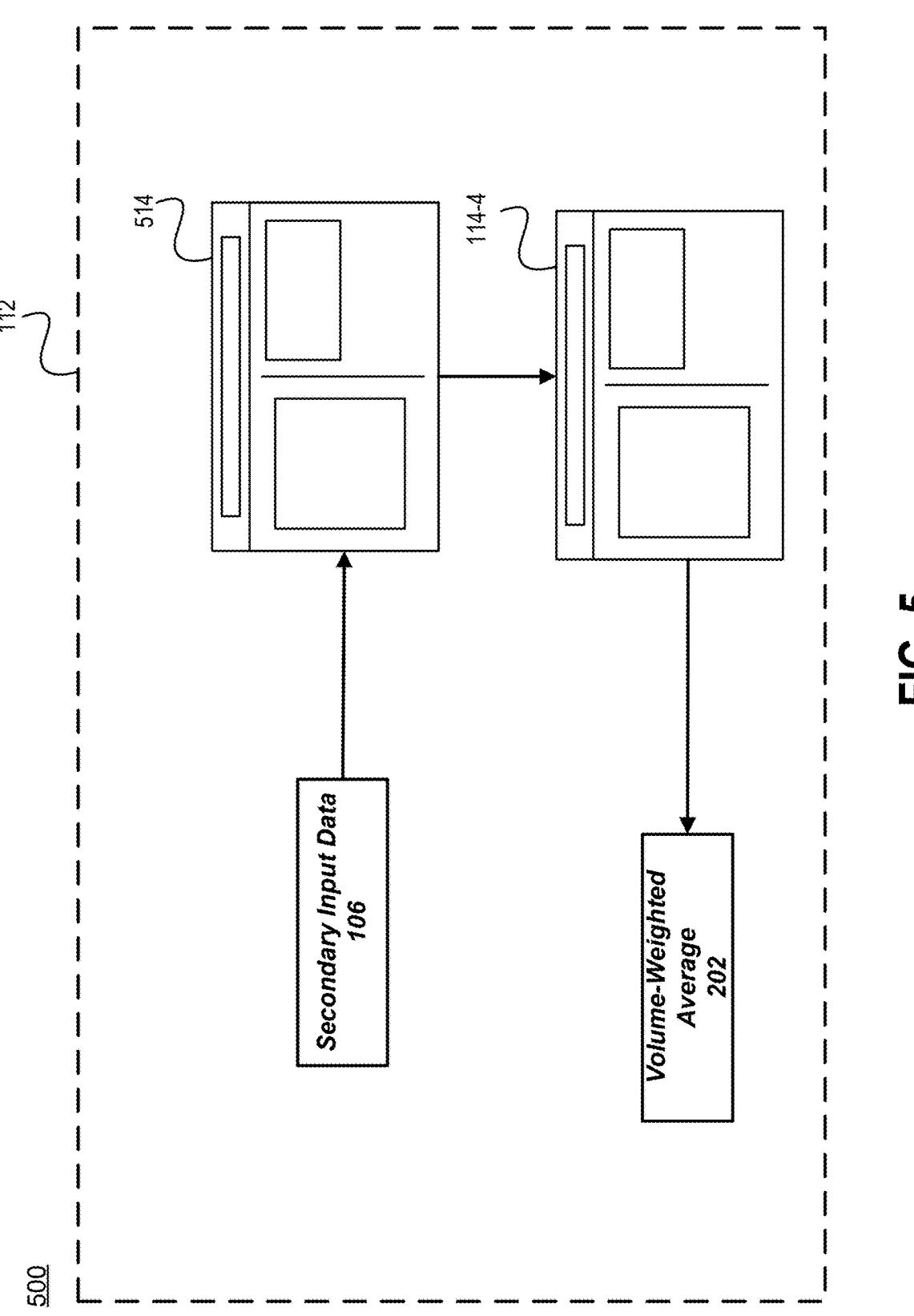
FIG. 5 is an example volume-weighted average generation process performed by a processing platform.

In these and other embodiments where the first entity identifier is received, secondary input data 106 may be stored in labeled database table 514, as illustrated in the example volume-weighted average generation process 500 of FIG. 5. Labeled database table 514 is a database table including a plurality of rows and columns and which may be cached or stored in persistent memory of processing platform 112. The entries of labeled database table 514 may each be labeled with an entity identifier. Processing platform 112 may then cache a subset of data from labeled database table 514 in fourth temporary checkpoint database table 114-4, where the subset is labeled with the first entity identifier, and generate volume-weighted average 202 based on fourth temporary checkpoint database table 114-4. Thus, processing platform 112 may conserve computational resources when a first entity identifier is received by generating volume-weighted average 202 based only on data associated with the entity corresponding to the first entity identifier, enabling representative values for the entity to be calculated without expending excess resources on calculations involving data associated with other entities.

In some embodiments, mixed data input 102 and/or input database table 124 are input into representative value machine learning model 122 by processing platform 112 to receive one or more representative values for an entity. Representative value 116 may then be received from representative value machine learning model 122 and stored in output database 120. In such embodiments, representative value machine learning model 122 may be trained in a generally similar manner to one or more of the manners described above, but using weights and patterns derived from a historical input database table (e.g., an input database table including data from a mixed data input generated previously to the current day) and/or a deterministically generated representative value (e.g., first representative value 216, second representative value 316, or third representative value 416).

Additionally or alternatively, subsets of mixed data input 102 may be input into different representative value machine learning models trained based on different historical data. For example, a first subset of mixed data input 102 that is associated with a first time window of the time window feature may be input into a first representative value machine learning model trained to generate one or more representative values based on weights and patterns derived from historical primary input data and historical secondary input data. The first time window may be a most recent time window and therefore correspond to data provided to the first representative value machine learning model, which is trained on historical primary input data and historical secondary input data that may be reliable for training predictions of recent data. As another example, a second subset of mixed data input 102 that is associated with a second time window of the time window feature may be input into a second representative value machine learning model trained to generate one or more representative values based on weights and patterns derived from historical primary input data and historical secondary input data and historical indicative input data. The second time window may be a less recent time window than the first time window and therefore the training of the second representative value model, which processes the corresponding data, is supplemented with indicative input data. As a third example, a third subset of mixed data input 102 that is associated with a third time window of the time window feature may be input into a third representative value machine learning model trained to generate one or more representative values based on historical indicative input data. The third time window may be the least time window of the time window feature and therefore the training of the third representative value model, which processes the corresponding data, does not include historical primary input data and historical secondary input data that may be unreliable for training predictions of data that is not recent.

Example Computing Environment

Figure 6:
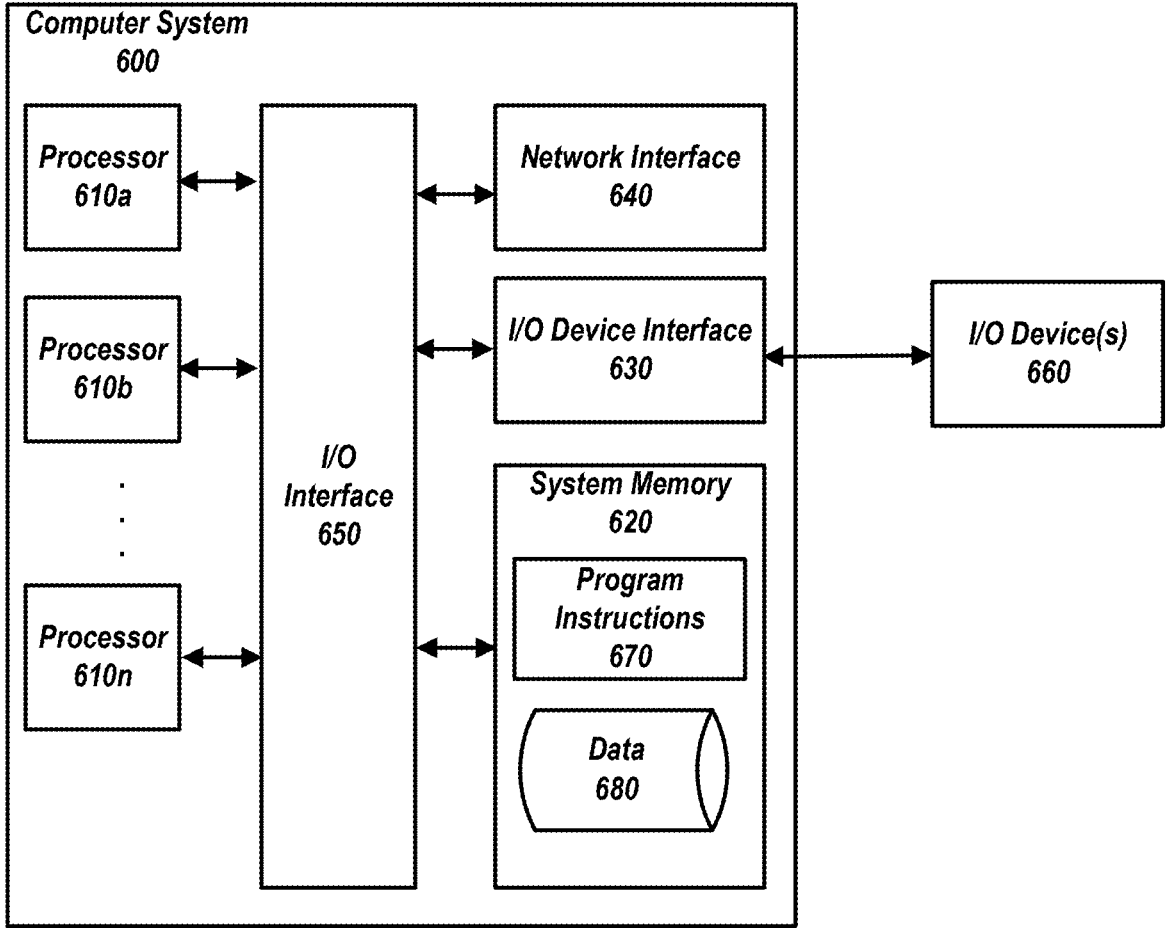
FIG. 6 shows an example computer system that may be used in accordance with some embodiments of this disclosure.

FIG. 6 shows an example computer system that may be used in accordance with some embodiments of this disclosure. In some instances, computing system 600 is referred to as a computer system 600. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610*a*-610*n*) coupled to system memory 620, an input/output (I/O) device interface 630, and a network interface 640 via an I/O interface 650. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special-purpose microprocessors. A processor may receive instructions and data from a memory (e.g., system memory 620). Computing system 600 may be a uni-processor system including one processor (e.g., processor 610*a*) or a multi-processor system including any number of suitable processors (e.g., 610*a*-610*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus may also be implemented as, special-purpose logic circuitry, e.g., an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computer system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on remote computer systems, for example, may be connected to computer system 600 via a network and network interface 640.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610*a*-610*n*) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 620 may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. A non-transitory, computer-readable storage medium may include non-volatile memory (e.g., flash memory, ROM, PROM, EPROM, EEPROM), volatile memory (e.g., random-access memory (RAM), static random-access memory (SRAM), synchronous dynamic RAM (SDRAM)), bulk storage memory (e.g., CD-ROM and/or DVD-ROM, hard drives), or the like. System memory 620 may include a non-transitory, computer-readable storage medium that may have program instructions stored thereon that are executable by a computer processor (e.g., one or more of processors 610a-610n) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610a-610n, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600 or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative and is not intended to limit the scope of the techniques described herein. Computer system 600 may include any combination of devices or software that may perform or otherwise provide for the performance of the techniques described herein. For example, computer system 600 may include or be a combination of a cloud computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 600 may also be connected to other devices that are not illustrated or may operate as a stand-alone system. In addition, the functionality provided by the illustrated components may, in some embodiments, be combined in fewer components or distributed in additional components. Similarly, in some embodiments, the functionality of some of the illustrated components may not be provided, or other additional functionality may be available.

Example Operation Flows

Figure 7:
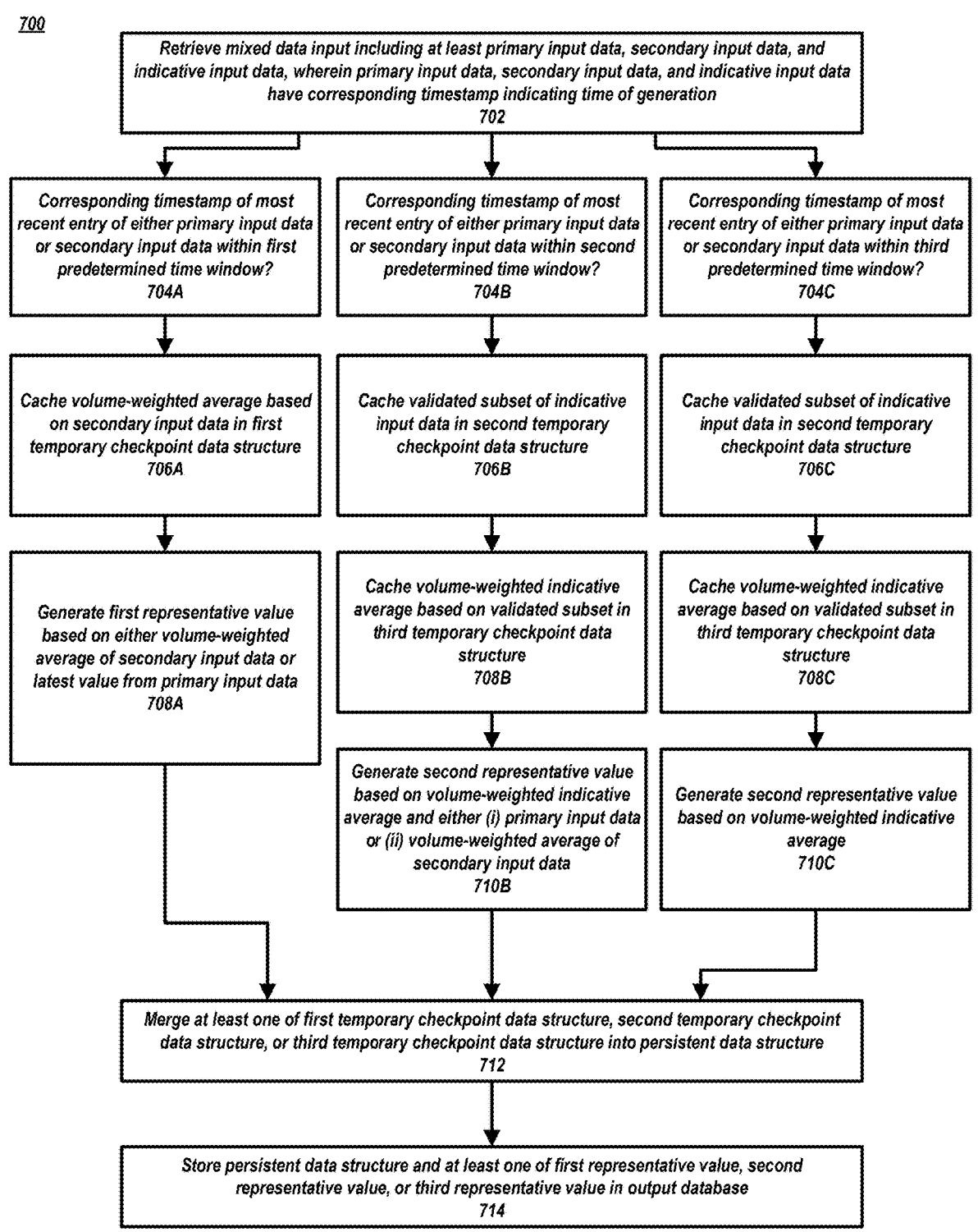
FIG. 7 is a flowchart of operations for processing mixed data input using a processing platform.

FIG. 7 is a flowchart of operations 700 for processing mixed data input using processing platform 112. The operations of FIG. 7 may use components described in relation to FIG. 6 above. In some embodiments, processing platform 112 may include one or more components of computer system 600. At 702, mixed data input including at least primary input data, secondary input data, and indicative input data is retrieved. Each entry in the primary input data, secondary input data, and indicative input data may have a corresponding timestamp indicating a time of generation. Primary input data may be associated with issuance of value indicators, secondary input data may be associated with transfer of value indicators, and indicative input data may be associated with unacknowledged value indicator transfer requests. In some embodiments, processing platform 112 retrieves mixed data input from system memory 620, I/O device interface 630, and/or network interface 640 using one or more processors 610a, 610b, and/or 610n.

At 704A, processing platform 112 determines whether a corresponding timestamp of a most recent entry of either primary input data or secondary input data to the mixed data input falls within a first predetermined time window. For example, processing platform 112 may use one or more processors 610a, 610b, and/or 610n to extract the corresponding timestamp from system memory 620 and compare the corresponding timestamp to the first predetermined time window. When the corresponding timestamp is verified to fall within the first predetermined time window, the operations 700 proceed to operation 706A and 708A. At 706A, processing platform 112 caches a volume-weighted average based on the secondary input data in a first temporary checkpoint data structure. For example, processing platform 112 may use one or more processors 610a, 610b, and/or 610n to cache the volume-weighted average in a volatile memory of system memory 620. At 708A, processing platform 112 generates a first representative value based on either the volume-weighted average of the secondary input data or a latest value from the primary input data. For example, processing platform 112 may use one or more processors 610a, 610b, and/or 610n to execute program instructions 670 that perform the generation.

At 704B, processing platform 112 determines whether a corresponding timestamp of a most recent entry of either primary input data or secondary input data to the mixed data input falls within a second predetermined time window. For example, processing platform 112 may use one or more processors 610a, 610b, and/or 610n to extract the corresponding timestamp from system memory 620 and compare the corresponding timestamp to the second predetermined time window. When the corresponding timestamp is verified to fall within the second predetermined time window, the operations 700 proceed to operation 706B, 708B, and 710B. At 706B, processing platform 112 caches a validated subset of the indicative input data in a second temporary checkpoint data structure. The validated subset may include data from the indicative input data that (i) is associated with a recent material update, (ii) has a value greater than a predetermined threshold value, and (iii) satisfies a set of plausibility criteria. Processing platform 112 may use one or more processors 610a, 610b, and/or 610n to cache the validated subset in a volatile memory of system memory 620. At 708B, processing platform 112 caches a volume-weighted indicative average based on the validated subset in a third temporary checkpoint data structure. Processing platform 112 may use one or more processors 610a, 610b, and/or 610n to cache the volume-weighted indicative average in a volatile memory of system memory 620. At 710B, processing platform 112 generates a second representative value based on the volume-weighted indicative average and either (i) the primary input data or (ii) a volume-weighted average of the secondary input data. For example, processing platform 112 may use one or more processors 610a, 610b, and/or 610n to execute program instructions 670 that perform the generation.

At 704C, processing platform 112 determines whether a corresponding timestamp of a most recent entry of either primary input data or secondary input data to the mixed data input falls within a third predetermined time window. For example, processing platform 112 may use one or more processors 610*a*, 610*b*, and/or 610*n* to extract the corresponding timestamp from system memory 620 and compare the corresponding timestamp to the third predetermined time window. When the corresponding timestamp is verified to fall within the third predetermined time window, the operations 700 proceed to operation 706C, 708C, and 710C. At 706C, processing platform 112 caches a validated subset of the indicative input data in a second temporary checkpoint data structure, as described in relation to 706B above. At 708C, processing platform 112 caches a volume-weighted indicative average based on the validated subset in a third temporary checkpoint data structure, as described in relation to 708B above. At 710C, processing platform 112 generates a third representative value based on the volume-weighted indicative average. For example, processing platform 112 may use one or more processors 610*a*, 610*b*, and/or 610*n* to execute program instructions 670 that perform the generation.

At 712, processing platform 112 merges at least one of the first temporary checkpoint data structure, the second temporary checkpoint data structure, or the third temporary checkpoint data structure into a persistent data structure. For example, processing platform 112 may use one or more processors 610*a*, 610*b*, and/or 610*n* to retrieve the temporary checkpoint data structures from a volatile memory of system memory 620 and combine the temporary checkpoint data structures into the persistent data structure.

At 714, processing platform 112 stores the persistent data structure and at least one of the first representative value, the second representative value, or the third representative value in an output database. For example, processing platform 112 may use one or more processors 610*a*, 610*b*, and/or 610*n* to store the persistent data structure in a nonvolatile memory of system memory 620.

I claim:

1. A system comprising:

one or more processors; and a non-transitory, computer-readable memory storing instructions thereon, which, when executed by the one or more processors, cause the system to:

retrieve a mixed data input, wherein the mixed data input comprises primary input data, secondary input data, and indicative input data, wherein each entry in the mixed data input has a corresponding timestamp indicating a time of generation, wherein the primary input data is associated with issuance of value indicators, wherein the secondary input data is associated with transfer of value indicators, and wherein the indicative input data is associated with unacknowledged value indicator transfer requests;

in response to a corresponding timestamp of a most recent entry of either the primary input data or the secondary input data to the mixed data input falling within a first predetermined time window:

cache a volume-weighted average based on the secondary input data in a first temporary checkpoint database table, and generate a first representative value based on either the volume-weighted average or a latest value from the primary input data;

in response to the corresponding timestamp of the most recent entry of either the primary input data or the secondary input data to the mixed data input falling within a second predetermined time window:

cache a validated subset of the indicative input data in a second temporary checkpoint database table, wherein the validated subset includes data from the indicative input data that (i) is associated with a recent material update, (ii) has a value greater than a predetermined threshold value, and (iii) satisfies a set of plausibility criteria, cache a volume-weighted indicative average based on the validated subset in a third temporary checkpoint database table, and generate a second representative value based on the volume-weighted indicative average and either (i) the primary input data or (ii) the volume-weighted average;

in response to the corresponding timestamp of the most recent entry of either the primary input data or the secondary input data to the mixed data input falling within a third predetermined time window:

cache the validated subset of the indicative input data in the second temporary checkpoint database table, cache the volume-weighted indicative average based on the validated subset in the third temporary checkpoint database table, and generate a third representative value based on the volume-weighted indicative average;

merge at least one of the first temporary checkpoint database table, the second temporary checkpoint database table, or the third temporary checkpoint database table into a persistent database table; and store the persistent database table and at least one of the first representative value, the second representative value, or the third representative value in an output database.

2. The system of claim 1, wherein the instructions further cause the one or more processors to:

execute a validation routine for at least one of the first temporary checkpoint database table, the second temporary checkpoint database table, or the third temporary checkpoint database table, wherein the validation routine includes at least one of a duplicate data check, a null data check, a categorical field check, a referential integrity check, or an expectation compatibility check;

in response to determining that the validation routine has failed for the first temporary checkpoint database table, regenerate the first temporary checkpoint database table, the second temporary checkpoint database table, and the third temporary checkpoint database table;

in response to determining that the validation routine has failed for the second temporary checkpoint database table, regenerate the second temporary checkpoint database table and the third temporary checkpoint database table;

in response to determining that the validation routine has failed for the third temporary checkpoint database table, regenerate the third temporary checkpoint database table;

merge at least one of the first temporary checkpoint database table, the second temporary checkpoint database table, or the third temporary checkpoint database table into the persistent database table; and delete the first temporary checkpoint database table, the second temporary checkpoint database table, and the third temporary checkpoint database table.

3. The system of claim 1, wherein the instructions further cause the one or more processors to:

sort a first set of entries from the validated subset into a sorted first set, the first set of entries having a sending transfer type;

cache a predetermined number of lowest-valued indicative input data entries from the sorted first set having the sending transfer type in a fourth temporary checkpoint database table;

sort a second set of entries from the validated subset into a sorted second set, the second set of entries having a receiving transfer type;

cache a predetermined number of highest-valued indicative input data entries from the sorted second set having the receiving transfer type in a fifth temporary checkpoint database table, wherein the predetermined number of highest-valued indicative input data entries matches the predetermined number of lowest-valued indicative input data entries; and generate the volume-weighted indicative average by calculating a median based on the data in the fourth temporary checkpoint database table and the fifth temporary checkpoint database table.

4. The system of claim 1, wherein the instructions further cause the one or more processors to determine that a first entry in the indicative input data satisfies the set of plausibility criteria by:

determining a first value of the first entry;

detecting that the first entry has a sending transfer type;

determining the first value is higher than a highest request value associated with an entry of the indicative input data having a receiving transfer type; and determining the first value is within a predetermined range from a lower value between (i) the volume-weighted average and (ii) the highest request value.

5. The system of claim 1, wherein the instructions further cause the one or more processors to determine that a first entry in the indicative input data is associated with the recent material update by:

detecting a first change in a value of the first entry;

detecting a second change in a value indicator type of the first entry, wherein the second change is from a value indicator issued by a first entity to the value indicator issued by a second entity; or detecting a third change in a transfer type of the first entry, wherein the third change is either (i) from having a sending transfer type to having a receiving transfer type, or (ii) from having the receiving transfer type to having the sending transfer type.

6. The system of claim 1, wherein the instructions cause the one or more processors to:

retrieve, for each entry within (i) the primary input data, (ii) the secondary input data, and (iii) the indicative input data, corresponding timestamps;

identify, based on the corresponding timestamps and a current date, a first set of entries having the corresponding timestamps changing from falling within the first predetermined time window on a previous day to falling within the second predetermined time window on a current day, and a second set of entries having the corresponding timestamps changing from falling within the second predetermined time window on the previous day to falling within the third predetermined time window on the current day; and generate the mixed data input by combining the first set of entries and the second set of entries.

7. The system of claim 1, wherein the instructions further cause the one or more processors to:

receive a first entity identifier corresponding to an entity, wherein the entity is associated with a subset of the data in the mixed data input;

store the secondary input data in a labeled database table, wherein each entry in the labeled database table is labeled with an entity identifier;

cache a subset of data from the labeled database table in a fourth temporary checkpoint database table, wherein the subset of data is labeled with the first entity identifier; and generate the volume-weighted average based on the fourth temporary checkpoint database table.

8. A method comprising:

retrieving, by a processing platform, a mixed data input, wherein the mixed data input comprises primary input data, secondary input data, and indicative input data, wherein each entry in the mixed data input has a corresponding timestamp indicating a time of generation, wherein the primary input data is associated with issuance of value indicators, wherein the secondary input data is associated with transfer of value indicators, and wherein the indicative input data is associated with unacknowledged value indicator transfer requests;

in response to a corresponding timestamp of a most recent entry of either the primary input data or the secondary input data to the mixed data input falling within a first predetermined time window:

caching, by the processing platform, a volume-weighted average based on the secondary input data in a first temporary checkpoint data structure, and generating, by the processing platform, a first representative value based on either the volume-weighted average or a latest value from the primary input data;

in response to the corresponding timestamp of the most recent entry of either the primary input data or the secondary input data to the mixed data input falling within a second predetermined time window:

caching, by the processing platform, a validated subset of the indicative input data in a second temporary checkpoint data structure, wherein the validated subset includes data from the indicative input data that (i) is associated with a recent material update, (ii) has a value greater than a predetermined threshold value, and (iii) satisfies a set of plausibility criteria, caching, by the processing platform, a volume-weighted indicative average based on the validated subset in a third temporary checkpoint data structure, and generating, by the processing platform, a second representative value based on the volume-weighted indicative average and either (i) the primary input data or (ii) the volume-weighted average;

in response to the corresponding timestamp of the most recent entry of either the primary input data or the secondary input data to the mixed data input falling within a third predetermined time window:

caching, by the processing platform, the validated subset of the indicative input data in the second temporary checkpoint data structure, caching, by the processing platform, the volume-weighted indicative average based on the validated subset in the third temporary checkpoint data structure, and generating, by the processing platform, a third representative value based on the volume-weighted indicative average;

merging, by the processing platform, at least one of the first temporary checkpoint data structure, the second temporary checkpoint data structure, or the third temporary checkpoint data structure into a persistent data structure; and storing, by the processing platform, the persistent data structure and at least one of the first representative value, the second representative value, or the third representative value in an output database.

9. The method of claim 8, further comprising:

executing, by the processing platform, a validation routine for at least one of the first temporary checkpoint data structure, the second temporary checkpoint data structure, or the third temporary checkpoint data structure, wherein the validation routine includes at least one of a duplicate data check, a null data check, a categorical field check, a referential integrity check, or an expectation compatibility check;

in response to determining that the validation routine has failed for the first temporary checkpoint data structure, regenerating, by the processing platform, the first temporary checkpoint data structure, the second temporary checkpoint data structure, and the third temporary checkpoint data structure;

in response to determining that the validation routine has failed for the second temporary checkpoint data structure, regenerating, by the processing platform, the second temporary checkpoint data structure and the third temporary checkpoint data structure;

in response to determining that the validation routine has failed for the third temporary checkpoint data structure, regenerating, by the processing platform, the third temporary checkpoint data structure;

merging, by the processing platform, at least one of the first temporary checkpoint data structure, the second temporary checkpoint data structure, or the third temporary checkpoint data structure into the persistent data structure; and deleting, by the processing platform, the first temporary checkpoint data structure, the second temporary checkpoint data structure, and the third temporary checkpoint data structure.

10. The method of claim 8, further comprising:

sorting, by the processing platform, a first set of entries from the validated subset into a sorted first set, the first set of entries having a sending transfer type;

caching, by the processing platform, a predetermined number of lowest-valued indicative input data entries from the sorted first set having the sending transfer type in a fourth temporary checkpoint data structure;

sorting, by the processing platform, a second set of entries from the validated subset into a sorted second set, the second set of entries having a receiving transfer type;

caching, by the processing platform, a predetermined number of highest-valued indicative input data entries from the sorted second set having the receiving transfer type in a fifth temporary checkpoint data structure, wherein the predetermined number of highest-valued indicative input data entries matches the predetermined number of lowest-valued indicative input data entries; and generating, by the processing platform, the volume-weighted indicative average by calculating a median based on the data in the fourth temporary checkpoint data structure and the fifth temporary checkpoint data structure.

11. The method of claim 8, further comprising determining that a first entry in the indicative input data satisfies the set of plausibility criteria by:

determining, by the processing platform, a first value of the first entry;

detecting, by the processing platform, that the first entry has a sending transfer type;

determining, by the processing platform, the first value is higher than a highest request value associated with an entry of the indicative input data having a receiving transfer type; and determining, by the processing platform, the first value is within a predetermined range from a lower value between (i) the volume-weighted average and (ii) the highest request value.

12. The method of claim 8, further comprising determining that a first entry in the indicative input data is associated with the recent material update by:

detecting, by the processing platform, a first change in a value of the first entry;

detecting, by the processing platform, a second change in a value indicator type of the first entry, wherein the second change is from a value indicator issued by a first entity to the value indicator issued by a second entity; or detecting, by the processing platform, a third change in a transfer type of the first entry, wherein the third change is either (i) from having a sending transfer type to having a receiving transfer type, or (ii) from having the receiving transfer type to having the sending transfer type.

13. The method of claim 8, further comprising:

for each entry within (i) the primary input data, (ii) the secondary input data, and (iii) the indicative input data, retrieving, by the processing platform, corresponding timestamps;

based on the corresponding timestamps and a current date, identifying, by the processing platform, a first set of entries having the corresponding timestamps changing from falling within the first predetermined time window on a previous day to falling within the second predetermined time window on a current day, and a second set of entries having the corresponding timestamps changing from falling within the second predetermined time window on the previous day to falling within the third predetermined time window on the current day; and generating, by the processing platform, the mixed data input by combining the first set of entries and the second set of entries.

14. The method of claim 8, further comprising:

receiving, by the processing platform, a first entity identifier corresponding to an entity, wherein the entity is associated with a subset of the data in the mixed data input;

storing, by the processing platform, the secondary input data in a labeled data structure, wherein each entry in the labeled data structure is labeled with an entity identifier;

caching, by the processing platform, a subset of data from the labeled data structure in a fourth temporary checkpoint data structure, wherein the subset of data is labeled with the first entity identifier; and generating, by the processing platform, the volume-weighted average based on the fourth temporary checkpoint data structure.

15. One or more non-transitory, computer-readable storage media comprising instructions recorded thereon, wherein the instructions, when executed by at least one data processor of a system, cause the system to:

retrieve a mixed data input, wherein the mixed data input comprises primary input data, secondary input data, and indicative input data, wherein the primary input data, the secondary input data, and the indicative input data have a corresponding timestamp indicating a time of generation, wherein the primary input data is associated with issuance of value indicators, wherein the secondary input data is associated with transfer of value indicators, and wherein the indicative input data is associated with unacknowledged value indicator transfer requests;

in response to a corresponding timestamp of a most recent entry of either the primary input data or the secondary input data to the mixed data input falling within a first predetermined time window:

cache a volume-weighted average based on the secondary input data in a first temporary checkpoint data structure, and generate a first representative value based on either the volume-weighted average or a latest value from the primary input data;

in response to the corresponding timestamp of the most recent entry of either the primary input data or the secondary input data to the mixed data input falling within a second predetermined time window:

cache a validated subset of the indicative input data in a second temporary checkpoint data structure, wherein the validated subset includes data from the indicative input data that (i) is associated with a recent material update, (ii) has a value greater than a predetermined threshold value, and (iii) satisfies a set of plausibility criteria, cache a volume-weighted indicative average based on the validated subset in a third temporary checkpoint data structure, and generate a second representative value based on the volume-weighted indicative average and either (i) the primary input data or (ii) the volume-weighted average;

in response to the corresponding timestamp of the most recent entry of either the primary input data or the secondary input data to the mixed data input falling within a third predetermined time window:

cache the validated subset of the indicative input data in the second temporary checkpoint data structure, cache the volume-weighted indicative average based on the validated subset in the third temporary checkpoint data structure, and generate a third representative value based on the volume-weighted indicative average;

merge at least one of the first temporary checkpoint data structure, the second temporary checkpoint data structure, or the third temporary checkpoint data structure into a persistent data structure; and store the persistent data structure and at least one of the first representative value, the second representative value, or the third representative value in an output database.

16. The one or more non-transitory, computer-readable storage media of claim 15, wherein the instructions further cause the system to:

execute a validation routine for at least one of the first temporary checkpoint data structure, the second temporary checkpoint data structure, or the third temporary checkpoint data structure, wherein the validation routine includes at least one of a duplicate data check, a null data check, a categorical field check, a referential integrity check, or an expectation compatibility check;

in response to determining that the validation routine has failed for the first temporary checkpoint data structure, regenerate the first temporary checkpoint data structure, the second temporary checkpoint data structure, and the third temporary checkpoint data structure;

in response to determining that the validation routine has failed for the second temporary checkpoint data structure, regenerate the second temporary checkpoint data structure and the third temporary checkpoint data structure;

in response to determining that the validation routine has failed for the third temporary checkpoint data structure, regenerate the third temporary checkpoint data structure;

merge at least one of the first temporary checkpoint data structure, the second temporary checkpoint data structure, or the third temporary checkpoint data structure into the persistent data structure; and delete the first temporary checkpoint data structure, the second temporary checkpoint data structure, and the third temporary checkpoint data structure.

17. The one or more non-transitory, computer-readable storage media of claim 15, wherein the instructions further cause the system to:

sort a first set of entries from the validated subset into a sorted first set, the first set of entries having a sending transfer type;

cache a predetermined number of lowest-valued indicative input data entries from the sorted first set having the sending transfer type in a fourth temporary checkpoint database table;

sort a second set of entries from the validated subset into a sorted second set, the second set of entries having a receiving transfer type;

cache a predetermined number of highest-valued indicative input data entries from the sorted second set having the receiving transfer type in a fifth temporary checkpoint database table, wherein the predetermined number of highest-valued indicative input data entries matches the predetermined number of lowest-valued indicative input data entries; and generate the volume-weighted indicative average by calculating a median based on the data in the fourth temporary checkpoint database table and the fifth temporary checkpoint database table.

18. The one or more non-transitory, computer-readable storage media of claim 15, wherein the instructions further cause the system to determine that a first entry in the indicative input data satisfies the set of plausibility criteria by:

determining a first value of the first entry;

detecting that the first entry has a sending transfer type;

determining the first value is higher than a highest request value associated with an entry of the indicative input data having a receiving transfer type; and determining the first value is within a predetermined range from a lower value between (i) the volume-weighted average and (ii) the highest request value.

19. The one or more non-transitory, computer-readable storage media of claim 15, wherein the instructions further cause the system to determine that a first entry in the indicative input data is associated with the recent material update by:

detecting a first change in a value of the first entry;

detecting a second change in a value indicator type of the first entry, wherein the second change is from a value indicator issued by a first entity to the value indicator issued by a second entity; or detecting a third change in a transfer type of the first entry, wherein the third change is either (i) from having a sending transfer type to having a receiving transfer type, or (ii) from having the receiving transfer type to having the sending transfer type.

20. The one or more non-transitory, computer-readable storage media of claim 15, wherein the instructions further cause the system to:

retrieve, for each entry within (i) the primary input data, (ii) the secondary input data, and (iii) the indicative input data, corresponding timestamps;

identify, based on the corresponding timestamps and a current date, a first set of entries having the corresponding timestamps changing from falling within the first predetermined time window on a previous day to falling within the second predetermined time window on a current day, and a second set of entries having the corresponding timestamps changing from falling within the second predetermined time window on the previous day to falling within the third predetermined time window on the current day; and generate the mixed data input by combining the first set of entries and the second set of entries.

\* \* \* \* \*